United States Patent [19]

dejong et al.

[11] Patent Number: 4,907,834

[45] Date of Patent: Mar. 13, 1990

[54] MULTI-FINGER HYDRAULIC END EFFECTOR

[75] Inventors: Joannes N. M. dejong, Suffern; Edward J. Solcz, Yorktown Heights; Edward J. Wrobbel, Fairport, all of N.Y.

[73] Assignee: Xerox Corporation, Stamford, Conn.

[21] Appl. No.: 161,691

[22] Filed: Feb. 29, 1988

[51] Int. Cl.$^4$ ............................................. B25J 15/10
[52] U.S. Cl. ...................................... 294/88; 294/115; 901/37; 901/39
[58] Field of Search .................. 294/81.61, 86.4, 87.1, 294/88, 106, 110.1, 113, 115, 116, 902; 269/25, 156; 414/736; 901/31, 36, 37, 39

[56] References Cited

U.S. PATENT DOCUMENTS

| | | | |
|---|---|---|---|
| 3,371,952 | 3/1968 | Hunger | 294/88 |
| 3,741,517 | 6/1973 | Pogonowski | 294/88 X |
| 3,901,547 | 8/1975 | Skinner | 294/88 |
| 4,452,479 | 6/1984 | Terai et al. | 294/88 |
| 4,463,635 | 8/1984 | Hafla et al. | 294/116 X |
| 4,623,183 | 11/1986 | Aomori | 294/86.4 |
| 4,627,654 | 12/1986 | Van Oost | 294/106 |
| 4,682,931 | 7/1987 | House | 294/88 X |

FOREIGN PATENT DOCUMENTS

| | | | |
|---|---|---|---|
| 141126 | 4/1980 | German Democratic Rep. | 294/88 |
| 246072 | 5/1987 | German Democratic Rep. | 901/37 |
| 249664 | 9/1987 | German Democratic Rep. | 901/37 |
| 45071 | 4/1979 | Japan | 294/88 |
| 872255 | 10/1981 | U.S.S.R. | 294/88 |
| 889423 | 12/1981 | U.S.S.R. | 294/88 |

Primary Examiner—Johnny D. Cherry
Attorney, Agent, or Firm—Robert A. Chittum

[57] ABSTRACT

An end effector for use with a robotic mechanism is disclosed which is capable of grasping cylindrical workpieces having a varying diameter off center and holding it with six degrees of freedom. The end effector has a plurality of sets of fingers, each set having three fingers which radially approach and retract from the workpiece with a spacing of 120 degrees between the movement direction of the fingers. The movement of each of the fingers in a set are coplanar, and the planar movement of each set of fingers are parallel with each other. Each finger is actuated by its own hydraulic cylinder which causes it to independently engage the workpiece. The cylinders are hydraulically operated by a hydraulic system having a pressurizing pump for flowing fluid from a tank through a bidirectional valve to a series of pilot operated check valves and then to the cylinders. The setting of the bidirectional valve determines whether the fingers grasp the workpiece or release it. Only after all fingers have made contact with the workpiece does the pressure in the system increase to cause the fingers to grip it with a predetermined force. The pilot operated check valves prevent the fluid from flowing back through them, thus enabling the end effector to support the workpiece without need for continual pump pressure. The bidirectional valve is then centered, so that the pump may be unloaded to save power. By reversing the bidirectional valve, the pilots of the check valves are actuated allowing flow reversal which retracts the fingers.

4 Claims, 2 Drawing Sheets

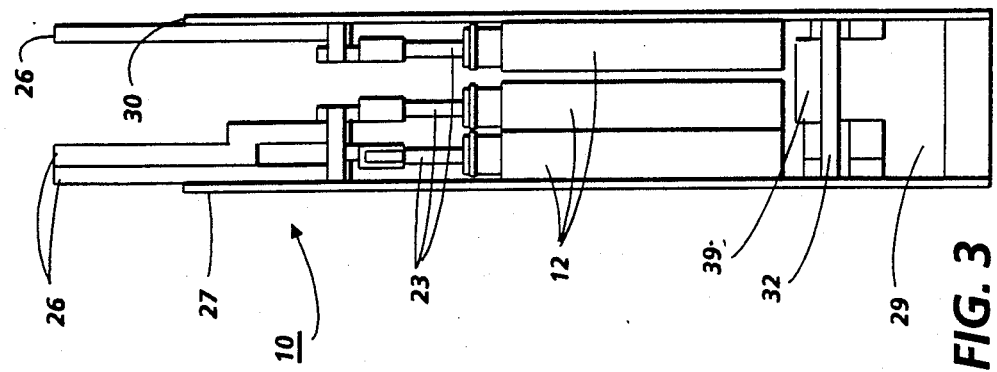
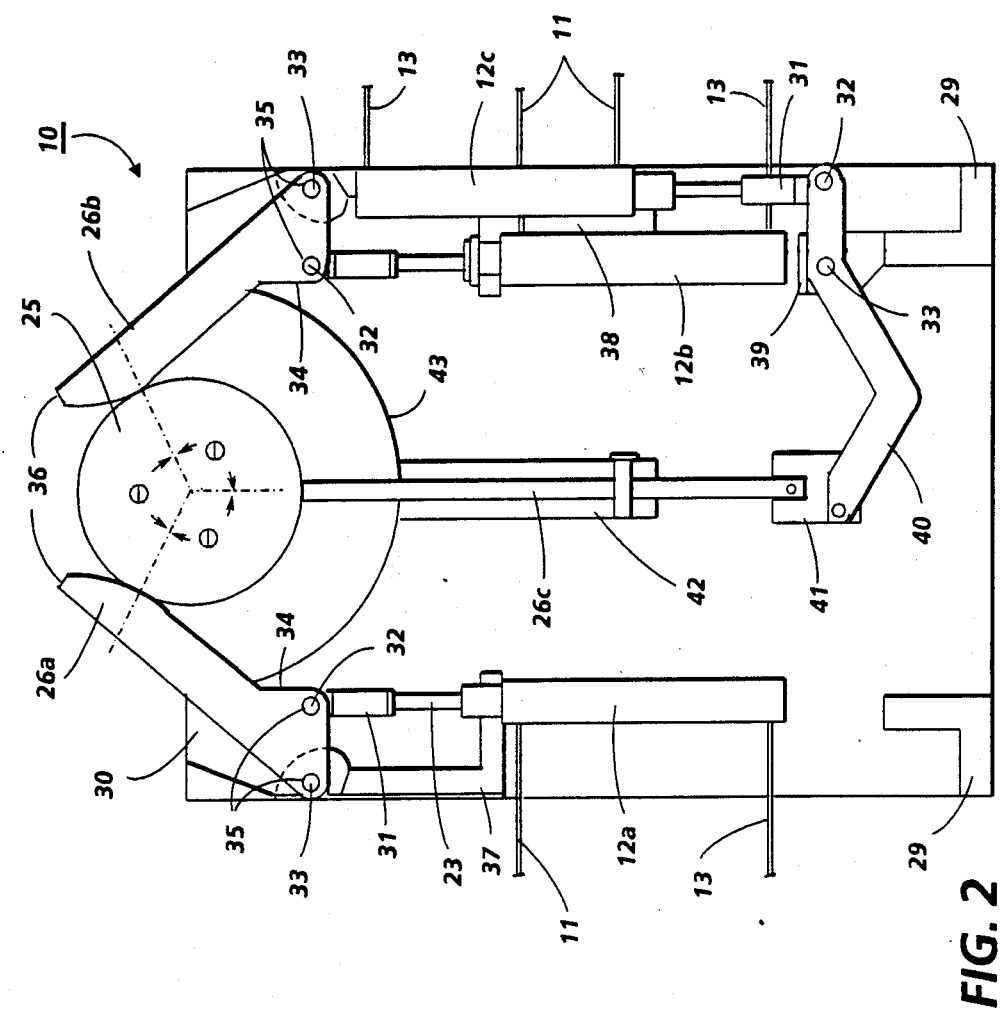

MULTI-FINGER HYDRAULIC END EFFECTOR

BACKGROUND OF THE INVENTION

1. Field of the Invention

This invention relates to an end effector for use with a robot, and, more particularly, to a multi-finger end effector in which each finger is independently operated hydraulically to engage parts of varying size and weight by a hydraulic actuating system. Only after all of the fingers contact the part does the hydraulic system pressure increase to permit prehension.

2. Description of the Prior Art

General purpose robots can perform a variety of tasks and manipulate parts of different geometry and weight. However, existing end effector or robotic hand designs are limited in that only a relatively few different part geometries and weights can be accommodated by a single end effector. This means that a set of different end effectors are required by the general purpose robots to handle a wide range of part geometries and weights.

U.S. patent application Ser. No. 915,596, now U.S. Pat. No. 4,799,853, filed Oct. 6, 1986, to Wrobbel et al, entitled "Self-Centering End Effector", and commonly assigned to the assignee of this invention discloses an apparatus which acquires individual articles having a cylindrical aperture therein from a supply of roughly aligned articles in a storage bin. The apparatus grips the article on the interior wall on the aperture therein, retracts the article from the storage bin, and moves it to a receiving member which aligns the longitudinal axis of the cylindrical aperture of the article parallel or coincidential with the longitudinal axis of the receiving member.

U.S. Pat. No. 4,627,654 to Van Oost discloses an articulated parallelogram gripper for use by a robot to grasp the inner or outer diameter of circular pieces. The gripper comprises three separate parallelogram linkage systems concurrently actuated by a hydraulic cylinder to move an arm fixedly attached thereto towards and away from the axis of the hydraulic cylinder. The linkage systems are positioned 120 degrees apart around the axis of the hydraulic cylinder. Each fixedly attached arm of the linkage systems has a finger extending therefrom which is parallel to the hydraulic cylinder axis, so that concurrent movement of the fingers are towards and away from the axis of the hydraulic cylinder. Thus, the fingers may grip the outer diameter of a cylindrical object or the internal diameter of a cylindrical opening or bore of an object to be moved.

U.S. Pat. No. 4,623,183 to Aomori discloses a robotic hand having three rotatable, coaxial sleeves with each having a decreasingly smaller diameter. The sleeves are positioned one inside the other and are independently rotatable by separate motors. Each sleeve has a pivotably mounted finger cantilevered therefrom and means to actuate the distal end of the finger towards and away from the sleeve's common axis. Selective independent rotation of the sleeves enables the fingers to grasp and/or support various cylindrically shaped parts.

U.S. Pat. No. 3,901,547 to Skinner discloses a multiple prehension robotic mechanism having three finger assemblies mounted on a base which can approach, contact, or pass one another during a prehensile operation. The fingers can be actuated by individual drive means or by one drive means operatively connected to all of the fingers for simultaneous pivoting into engagement of variously shaped objects.

SUMMARY OF THE INVENTION

It is an object of the present invention to provide an end effector for a robot which can accommodate different parts having a wide range of varying sizes and weights.

It is another object of this invention to provide an end effector having a plurality of gripping fingers, each independently actuated so that all fingers must contact the part or workpiece before a gripping force is applied.

It is still another object of this invention to provide an end effector capable of grasping parts off center within a predetermined range and hold the part in all six degrees of freedom.

It is yet another object of this invention to provide an end effector which operates all fingers through one bidirectional solenoid valve.

In the present invention, an end effector which can accommodate many different parts of varying size and weight is described. Though small in size and weight, the end effector has the ability to hold a part in six degrees of freedom even when grasping a part off center. In one embodiment, the end effector has three sets of fingers having three fingers each. The fingers of each set are adapted to move radially towards and away from a common axis with a spacing of about 120 degrees apart. Each finger is individually actuated by a separate hydraulic cylinder which causes it to independently engage a part. A hydraulic pump generates a fluid flow which is diverted through a series of pilot operated check valves, one for each hydraulic cylinder, by a directional valve to move the fingers. Only after all fingers have made contact with the part does the pressure in the system increase to cause the fingers to grip the part with a predetermined force. The pilot operated check valves prevent the fluid from flowing back therethrough, thus supporting the part without need for continual pump pressure. A directional valve is centered at this time to unload the pump and save power. After the robot positions the part at the desired destination, the part is released by reversing the directional valve. This actuates all of the pilots of the check valves and, by allowing flow reversal, retracts the fingers via the hydraulic cylinders.

These and other objects, together with a better understanding of the invention, will become apparent by referring to the following drawings in conjunction with the description of the invention, wherein like index numerals identify like parts.

BRIEF DESCRIPTION OF THE DRAWINGS

FIG. 2 is a front view of the end effector of the present invention with the front support plate removed to better show the fingers, hydraulic cylinders, and actuating linkage therebetween.

FIG. 3 is a side view of the end effector of FIG. 2, showing the three sets of fingers.

DESCRIPTION OF THE PREFERRED EMBODIMENT

Figure 1:
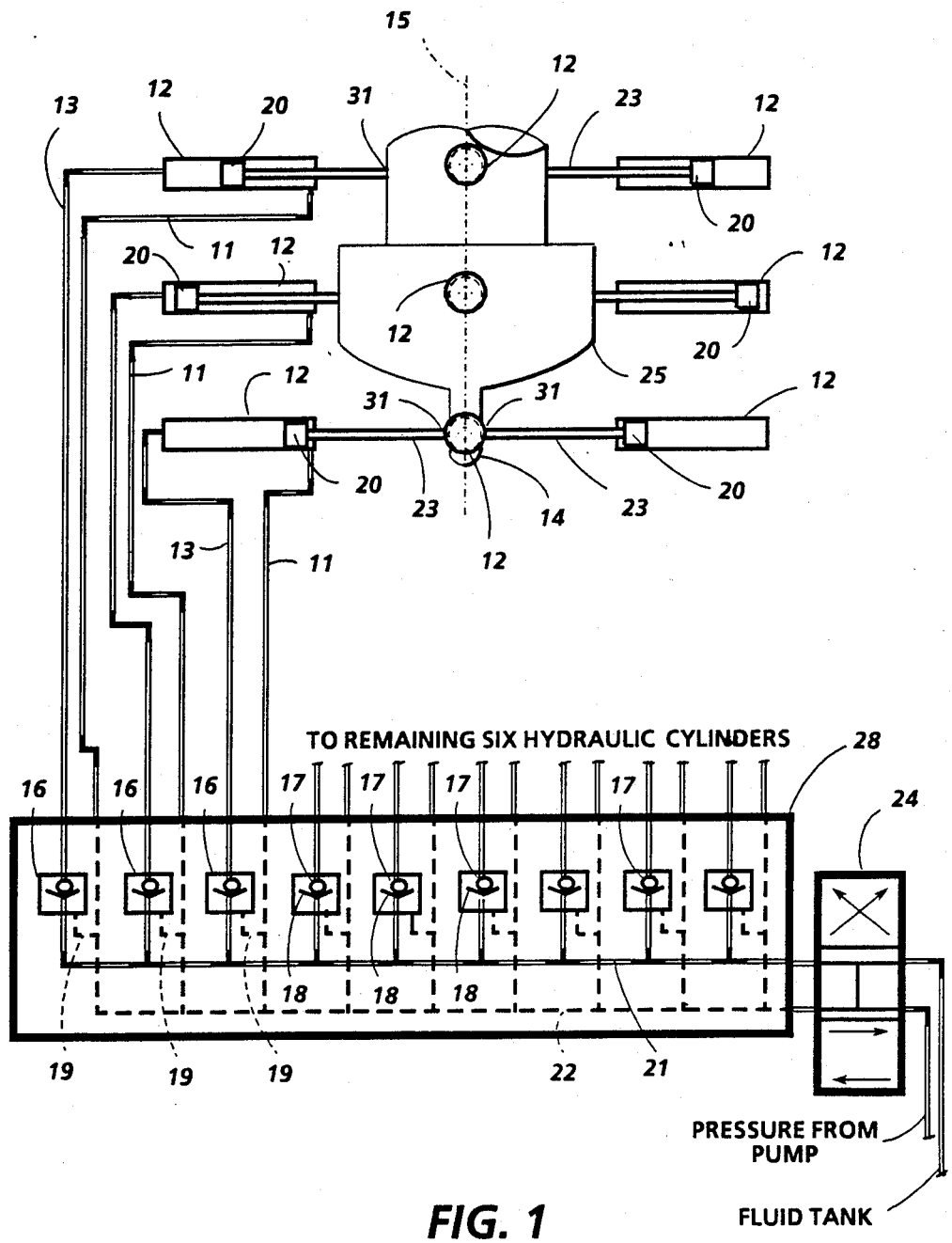
FIG. 1 is a schematic diagram of the operating principle of the present invention, showing the hydraulic circuitry which operates the hydraulic cylinders which in turn individually actuate the end effector fingers.

Referring to FIG. 1, a schematic diagram of the operating principle of the end effector 10 of the present invention is shown. For clarity, the hydraulic cylinders 12 are depicted as having their piston rods 23 acting directly on the cylindrical part or workpiece 25, instead of through fingers 26 as is actually the case and shown in FIG. 2. In the preferred embodiment, three sets of three fingers are used in which the fingers of each set lie in a plane and are arranged to move radially toward and away from the axis 15 of part 25 with an angular spacing $\theta$ (see FIG. 2) of substantially 120 degrees between each finger. The number of finger sets is entirely optional and depends upon the application for which the end effector is to be used. The planes of each set of fingers are parallel with each other and spaced a predetermined distance apart. Each cylinder 12 has a piston 20 connected to one end of the piston rod or shaft 23, the opposite or distal end of which contacts the part 25. Note that, within the predetermined design range, the part diameter may vary along its axis without reducing the grasping effectiveness of the end effector. A hydraulic pump (not shown) generates a fluid flow from a fluid reservoir tank (not shown) through a directional valve 24 via hydraulic lines 21,22 to a series of pilot operated check valves 16 assembled in a manifold 28. All nine hydraulic cylinders 12 have pistons which move independently to engage the part 25 when the directional valve 24 is adjusted to open line 21 to receive pressurized fluid from the tank while venting line 22 to to tank. This causes check valve balls 17 of the pilot operated check valves 16 to be raised from their valve seats 18 and permit the flow of fluid through hydraulic lines 13 which in turn move pistons 20 of the hydraulic cylinders in a direction to extend their piston rods 23 into contact with the part. Only after all of the pistons have moved the distal ends 31 of their piston rods 23 into contact with the part 25 does the pressure in the hydraulic cylinders increase to the relief valve (not shown) setting, whereat, the pilots seat and the part is grasped with a predetermined pressure. The pilot operated check valves prevent fluid from flowing back through them, thus supporting the part without need of continual fluid flow. The directional valve 24 is then centered at this time thereby unloading the pump and saving power. The robot on which the end effector 10 is attached now moves the part to the destination where it is released by reversing the directional valve 24. This reversal of the directional valve actuates all the pilots of the check valves via lines 19, thus allowing flow reversal through lines 13 and 21 and enabling the pistons to move in the opposite direction under the influence of pressurized flow through lines 22 and 11 to the hydraulic cylinders. The movement of the pistons in this direction retracts the piston rods from contact with the part.

A front view of the end effector 10 of the present invention is shown in FIG. 2, with the front support plate 27 removed to better show the fingers 26, actuating hydraulic cylinders 12, and interconnecting linkage, described later. FIG. 3 is a side view of the end effector, with the hydraulic cylinders for the center fingers removed for better showing the three sets of fingers 26. The fingers of each set are substantially coplanar and each coplanar set is parallel to each other. The sets of fingers are assembled parallel to and between parallel front and back support plates 27, 30. The support plates are fastened together by mounting brackets, two brackets 29 having mutually perpendicular sides at the bottom and two other brackets 37, 38 for mounting the hydraulic cylinders and strengthening the end effector. Two of the sets of fingers are very close together and the third set is about two inches removed therefrom to support moments generated by overhanging portions of the part being gripped and substantially manipulated. This spacing is entirely discretionary. It could be more or less depending on allotted space, part size, and forces involved. One inch stroke hydraulic cylinders 12 actuate each of the fingers and are fixedly mounted to the support plates via the brackets 37, 38. The left and right fingers 26a and 26b, respectively, of each set are flat with a thickness of 2 to 5 mm and have a triangular shaped portion 34 at one end with at least two apertures 35 therein. The left and right fingers are rotatably mounted in mirror fashion on pivot pins 33 inserted through one of the finger apertures. The pivot pins are fixed between and normal to the front and back support plates 27 and 30, respectively. The piston rods 23 of hydraulic cylinders 12a and 12b are connected to the triangular shaped portion of the fingers via connecting rods 31 and push pins 32 mounted in the other aperture of the fingers, so that when they are rotated around the pivot pins 33 their distal ends 36 rotate towards each other. The left and right fingers have a predetermined curvature on their confronting edges at the distal ends, so that the points of contact of the fingers with the part to be grasped are about 120 degrees apart and on a radius of the part, regardless of the part diameter. The third finger 26c of each set is arranged to move into contact with the part and retract therefrom along a radial line from the center of the part, so that the third finger point of contact is 120 degrees from each of the other fingers. Thus, the points of contact of the fingers of each set thereof are always approximately 120 degrees apart. The push-pull motion of the third finger is accomplished by a hydraulic cylinder mounted parallel to the other cylinders, but with the piston rod operating in the opposite direction. A pivot bracket contains a pivot pin 33 on which a lifting arm 40 is pivotally mounted. One end of the lifting arm is pivotally mounted to the piston rod of the center finger cylinder 12c via a connecting rod 31 and push pin 32. The opposite end of the lifting arm is pivotally connected to a push plate 41 which in turn is connected to the third finger 26c. Parallel elongated supports positioned on each side of the third finger act as a finger guide 42 to prevent the third finger from moving out of the desired direction of travel as it slides towards and away from the part to be grasped, when actuated by the cylinder 12c. The front and back support plates have predetermined circular cutouts 43 to provide clearance for cylindrical parts, such as, for example, metal shock, with diameters varying from 0.25 to 5 inches and lengths varying from 0.25 to 24 inches. The maximum weight of each part to be handled by the end effector is at least 5 pounds. Depending upon the size, weight, and force requirements, the specifications for the end effector will increase or decrease without changing the spirit of the invention.

The preferred embodiment of the end effector enables the holding of parts or workpieces in all six degrees of freedom even though it grasps the part off center by 0.125 to 0.5 inches, depending on the part size. The overall dimensions of the end effector is about 8.5 inches wide by 11 inches high by 2.5 inches thick and weighs less than 10 pounds. The finger grasping force is between 5 and 100 pounds as generated by the hydraulic pressure produced by the end effector's pump. The finger tip force is programmable through a controller (not shown) which programs the pump pressure, and a single bidirectional valve 24 operates all fingers with independent actuation, so that the end effector is geometrically independent within its design range.

Many modifications and variations are apparent from the foregoing description of the invention and all such modifications and variations are intended to be within the scope of the present invention.

We claim:

1. An end effector for a robotic mechanism to enable prehensile operation on a cylindrical part having an outer surface and an axis, comprising:

a housing being attached to the robotic mechanism;

a plurality of sets of fingers assembled in the housing, each set containing at least three elongated fingers having first and second ends, the first ends thereof extending from the housing and each set being adapted for coplanar movement in directions radially towards and away from the axis of the cylindrical part;

a plurality of piston operated hydraulic cylinders being fixedly mounted within the housing, each hydraulic cylinder having a piston and a piston rod, the piston rod being connected to the piston at one end with the opposite end portion protruding from the hydraulic cylinder, each hydraulic cylinder being used to extend and withdraw its respective piston rod, there being one cylinder for each finger;

means for connecting the distal end of each protruding piston rod end portion to a respective one of the finger second ends;

hydraulic circuit means for individually and concurrently applying a fluid pressure to the cylinder pistons to cause them to extend their piston rods independently of each other, so that each finger first end is moved independently towards and into contact with the outer surface of the part whether it has a varying diameter or not; and means to cause the finger first ends contacting the outer surface of the part to apply and hold a predetermined prehensile force thereon, so that the robotic mechanism may move the part to the desired destination.

2. The end effector of claim 1, wherein the housing has parallel front and back support plates and first and second ends; wherein the finger first ends extend from the first end of the housing and the housing second end is connected to the robotic mechanism; wherein the finger first ends of each set of fingers contact the part substantially 120 degrees apart; wherein the coplanar movement of each set of fingers are parallel with each other; and wherein the hydraulic circuit means prevents the finger first ends from applying a force on the part until after all of the finger first ends are in contact therewith by providing the fluid pressure to each of the cylinder pistons in parallel with each other.

3. The end effector of claim 2, wherein the hydraulic circuit means comprises:

a bidirectional valve for directing a flow of the pressurized fluid therethrough and in one of two directions at a time, one direction being to one side of each of the cylinder's pistons for part prehension and the other direction being to the other side of each of the cylinder's pistons for part release, the bidirectional valve having a centered position whereat flow of the fluid therethrough is prevented; and a series of pilot operated check valves, one for each cylinder and connected in parallel to the bidirectional valve, whereby after prehension of the part, the pilot operated check valves prevent fluid from flowing back through them, thus supporting the part without need of continual fluid flow, thereby allowing the bidirectional valve to be centered, so that power is saved without loss of prehensile force on said part.

4. The end effector of claim 2, wherein the first ends of two fingers of each set of fingers rotate toward and away from each other and have a predetermined curvature on their confronting first ends, so that the points of finger contact with the part to be grasped are substantially 120 degrees apart from the part axis, regardless of part diameter; and wherein the first end of the third finger of each set of fingers approaches and retracts radially from the part, so that the third finger point of contact with the part is 120 degrees from each of the other two fingers of the set of fingers.

* * * * *